(12) United States Patent
Cooper et al.

(10) Patent No.: US 11,711,295 B2
(45) Date of Patent: Jul. 25, 2023

(54) CONTROLLER, COMPUTER PROGRAM AND METHOD FOR CALCULATING HOST SPECIFIC NETWORK PATHS

(71) Applicant: Sony Corporation, Tokyo (JP)

(72) Inventors: Richard Cooper, Basingstoke (GB); Jian-Rong Chen, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/140,188

(22) Filed: Jan. 4, 2021

(65) Prior Publication Data

US 2021/0226886 A1    Jul. 22, 2021

(30) Foreign Application Priority Data

Jan. 16, 2020 (GB) ...................................... 2000664

(51) Int. Cl.
  *H04L 45/302*  (2022.01)
  *H04L 45/12*   (2022.01)
  *H04L 45/00*   (2022.01)
  *H04L 47/125*  (2022.01)
  *H04L 41/0813* (2022.01)

(52) U.S. Cl.
  CPC ...... *H04L 45/3065* (2013.01); *H04L 41/0813* (2013.01); *H04L 45/12* (2013.01); *H04L 45/22* (2013.01); *H04L 45/566* (2013.01); *H04L 47/125* (2013.01)

(58) Field of Classification Search
  CPC ..... H04L 45/3065; H04L 45/12; H04L 45/22; H04L 45/566; H04L 47/125
  See application file for complete search history.

(56) References Cited

U.S. PATENT DOCUMENTS

| | | | |
|---|---|---|---|
| 6,633,544 B1 | 10/2003 | Rexford et al. | |
| 7,593,341 B1 | 9/2009 | Buriol et al. | |
| 2005/0038909 A1* | 2/2005 | Yoshiba | H04L 45/12 709/241 |
| 2012/0039161 A1* | 2/2012 | Allan | H04L 45/28 370/216 |
| 2013/0343229 A1* | 12/2013 | Gasparakis | H04L 45/48 370/256 |
| 2016/0234102 A1* | 8/2016 | Kotalwar | H04L 45/64 |
| 2017/0195218 A1* | 7/2017 | Schrum, Jr | H04L 45/02 |
| 2019/0327175 A1* | 10/2019 | Ying | H04L 45/306 |

FOREIGN PATENT DOCUMENTS

EP    1 705 841 A1    9/2006
EP    2 784 994 A1    10/2014

OTHER PUBLICATIONS

Matta et al., "On Routing Real-Time Multicast Connections", IEEE, 1999, pp. 65-71.

* cited by examiner

*Primary Examiner* — Abdulkader M Alriyashi
(74) *Attorney, Agent, or Firm* — Oblon, McClelland, Maier & Neustadt, L.L.P.

(57) ABSTRACT

A method of calculating a new route for a media data traffic flow on a computer network when a device is connected to the network, the network comprising a first and a second network switch connected by a link, the method comprising: determining whether media data traffic already flows between the first and second network switch over the link; applying a weighting to the link whose value is based on whether media data traffic already flows over the link; and determining the new route for media data traffic by using a least cost path generation algorithm using the weighting.

12 Claims, 8 Drawing Sheets

```
                              63   60 59                             0
                              +--------+----------------------------+
General Cookie Format:        |  TAG   |         Extra Data         |
                              +--------+----------------------------+

63   60 59                             0
                              +--------+----------------------------+
Broadcast Flow Cookie:        |  0x1   |           Unused           |
                              +--------+----------------------------+

63   60 59     48 47                   0
                              +--------+--------+-------------------+
Unicast Flow Cookie:          |  0x2   | Unused |    MAC Address    |
                              +--------+--------+-------------------+

63   60 59       32 31                 0
                              +--------+----------+-----------------+
Multicast Flow Cookie:        | Multicast Address | Unicast Address |
                              |  0xE   |          |                 |
                              +--------+----------+-----------------+

63   60 59  56 55                      0
                              +--------+------+--------------------- +
Multicast Sampling Cookie:    |  0x3   | 0x1  |        Unused        |
(Sampling Rule A)             +--------+------+--------------------- +

63   60 59  56 55                      0
                              +--------+------+--------------------- +
Multicast Sampling Cookie:    |  0x3   | 0x2  |        Unused        |
(Sampling Rule B)             +--------+------+--------------------- +

63   60 59                             0
                              +--------+----------------------------+
ARP to Controller:            |  0x5   |           Unused           |
                              +--------+----------------------------+

63   60 59                             0
                              +--------+----------------------------+
IGMP to Controller:           |  0x6   |           Unused           |
                              +--------+----------------------------+

63   60 59                             0
                              +--------+----------------------------+
LLDP to Controller:           |  0x7   |           Unused           |
                              +--------+----------------------------+
                                         FIG. 6
```

CONTROLLER, COMPUTER PROGRAM AND METHOD FOR CALCULATING HOST SPECIFIC NETWORK PATHS

BACKGROUND

Field of the Disclosure

The present technique relates to a controller, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In some computer networks, such as those in media networks, flows of UDP packets carrying video and/or audio signals must arrive roughly in sequence. Therefore, each flow must be transmitted through the network via a single route (although different flows can take different routes as needed).

It is therefore difficult to route these media flows through complex networks which may contain one or more loops and/or one or more multi-links, while maintaining the above constraint. As would be appreciated, the term multi-link is defined as two or more links between the same two switches and a network loop as a cycle in the network then represented as a graph.

Loops and multi-links require particular treatment in networks. It is known to have a spanning-tree type protocol and equal cost multi-path routing. In the spanning-tree protocol one or more links in the network are disabled to break any loops and remove any multi-links. The remaining links form a spanning tree over the network. In this case, a benefit of the extra links is for failover, and bandwidth is wasted. In the equal cost multi-path routing case, packets can be transmitted via a range of alternative routes. This load balances the traffic and makes full use of the available bandwidth, but breaks the constraint that all AV flows of the same bundle (i.e. audio, video streams) must take the same route. This makes it difficult for the flows belong to the same bundle to be synchronised at the receivers.

Therefore, existing protocols are not particularly suited to media networks. It is an aim of the present disclosure to achieve high utilisation of the available bandwidth in the network and load balancing across the network whilst also allowing all flows of a media bundle to take the same route so that they arrive roughly in synchronisation at the destination receiver.

SUMMARY

According to embodiments, there is provided a method of calculating a new route for a media data traffic flow on a computer network when a device is connected to the network, the network comprising a first and a second network switch connected by a link, the method comprising: determining whether media data traffic already flows between the first and second network switch over the link; applying a weighting to the link whose value is based on whether media data traffic already flows over the link; and determining the new route for media data traffic by using a least cost path generation algorithm using the weighting.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3-1 to 3-5 show a mechanism for determining a route when the data traffic is unicast data traffic;

FIGS. 4-1 to 4-3 show a mechanism for determining a route when the data traffic is multicast data traffic;

FIG. 5 shows a flowchart 500 carried out by processing circuitry 205 in the controller 200; and FIG. 6 shows an exemplary format for cookies.

DESCRIPTION OF THE EMBODIMENTS

Figure 1:
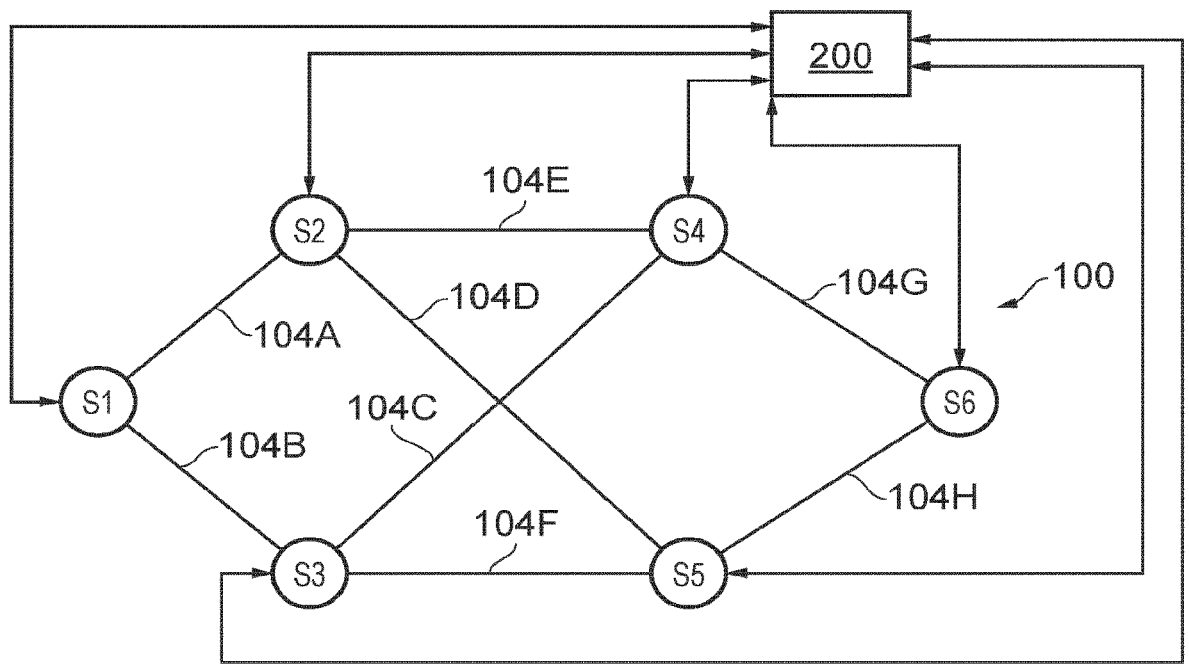
FIG. 1 shows a network 100 according to embodiments of the present disclosure.

Referring now to the drawings, wherein like reference numerals designate identical or corresponding parts throughout the several views.

FIG. 1 shows a diagram of a computer network 100 containing loops according to embodiments of the disclosure. It will be understood that the network may also contain multi-links, although none have been shown in this case for ease of explanation. A computer network 100 of this type may be located in a media production facility or the like. This computer network 100 comprises switches S1, S2, S3, S4, S5 and S6. Switches S1, S2, S3, S4, S5 and S6 in the computer network are connected by trunk links 104A, 104B, 104C, 104D. 104E, 104F, 104G, and 104H. Access links, not shown in FIG. 1, connect switches S1, S3 and S6 to endpoint devices (which are sometimes referred to a device. Media Node or host or similar). For the sake of brevity, endpoint devices are not shown in FIG. 1. However, typically, endpoint devices may be a camera, a monitor, or any kind of media production asset. As would be appreciated, any endpoint device is envisaged such as a switcher, microphone or any kind of appropriate device.

Switch S1 connects to switch S2 and S3 using trunk links 104A and 104B and switch S6 connects to the switch S4 and S5 using trunk links 104G and 104H. Specifically, the trunk links 104A, 104B, 104G and 104H connect using trunk ports located in the leaf switches S1 and S6 respectively.

Each of the switches within the network 100 is connected to a controller 200 according to embodiments of the disclosure.

Figure 2:
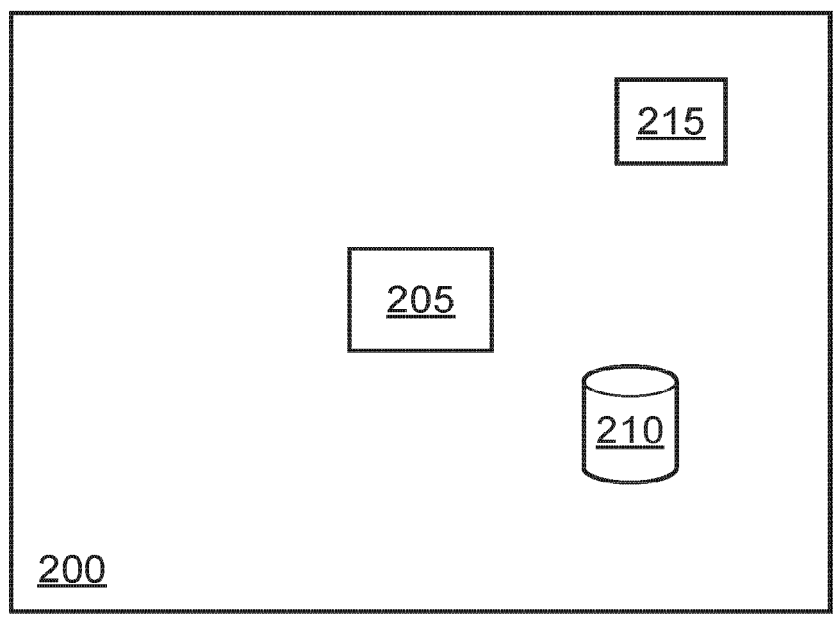
FIG. 2 shows a controller 200 according to embodiments of the present disclosure.

FIG. 2 shows a diagram of the controller 200 according to embodiments of the disclosure. The controller 200 comprises processing circuitry 205. The processing circuitry 205 is circuitry that operates under the control of software code. The software code is stored within storage 210. The storage 210 may be any kind of storage that is capable of storing software code therein or thereon such as solid state storage or magnetically or optically readable storage. The software code configures the controller 200 to perform methods according to embodiments of the disclosure.

Additionally provided in the controller 200 is communication circuitry 215. The communication circuitry 215 communicates with each of the switches S1-S6. This communication may be over an Ethernet link, wireless link or other link as would be appreciated.

Embodiments of the disclosure are applied to unicast routing and multicast routing of data traffic flows across a network. It should be noted that embodiments described with reference to multicast data traffic flows are also relevant to unicast data traffic flows and vice versa. Additionally, embodiments of the disclosure relate to broadcast data traffic flows.

Figures 1, 3:
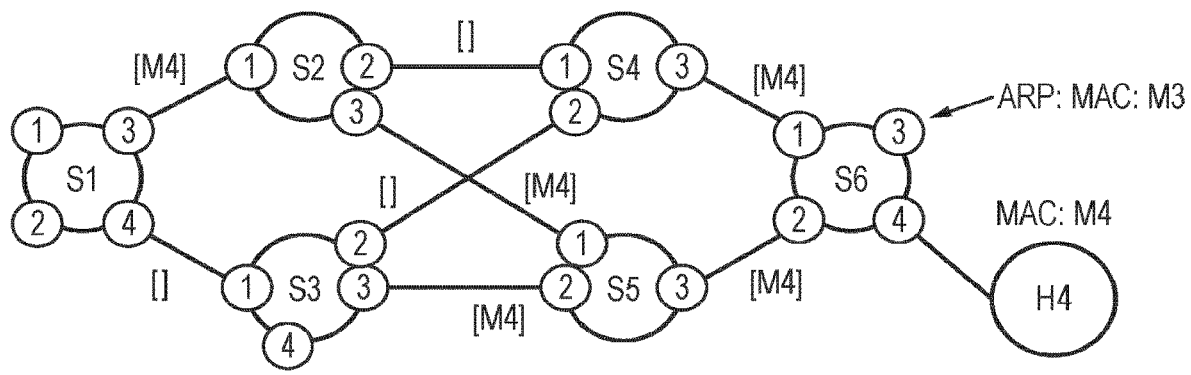
Figures 2, 3:
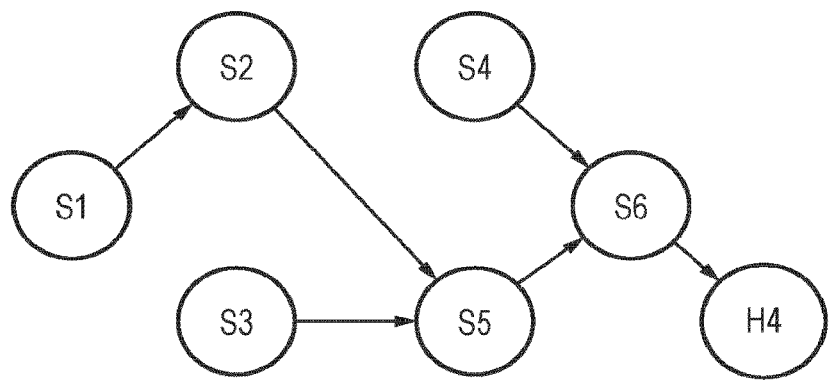
Figure 3:
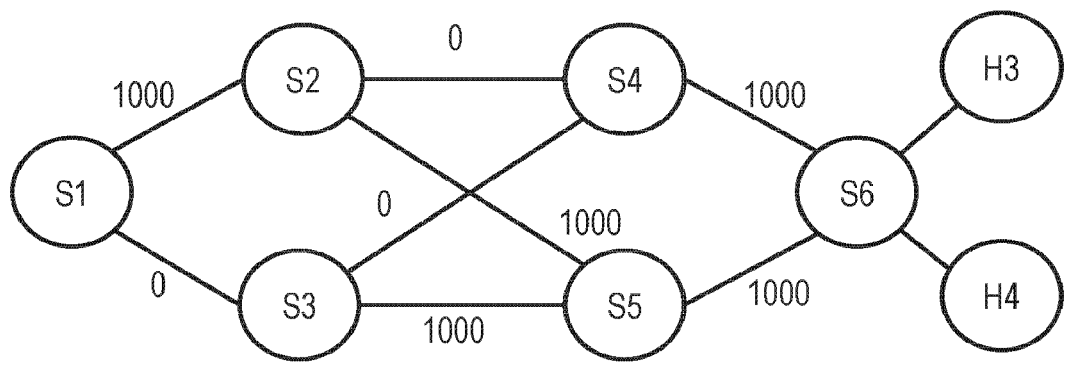

Unicast Routing FIG. 3-1 shows the network of FIG. 1 in an example state of operation. At this example point in time, an endpoint H4, with Media Access Control (MAC) address M4, is connected to access port 4 of access switch S6. The data traffic flows around the network using the links between respective switches. The network has already been configured according to this disclosure such that data traffic intended for endpoint H4, addressed by MAC address M4, is routed via the network links marked by [M4]. This association between the MAC address M4 and the links marked [M4] will be stored in the storage 210 of controller 200. In addition, other metadata associated with the links may be stored. For example, metadata associated with the source node ID and the destination node ID, the source and destination port numbers, maximum bandwidth supported across the link and the like may be stored.

In addition to the trunk ports and trunk links shown in 100, the access ports 1 and 2 of S1, access port 3 of S3 and access ports 3 and 4 of S6, are shown. These ports are used to connect endpoints to the network.

These ports are identified as access ports by way of being active ports of the respective switches, while not being connected, by a link, to another switch. For the purpose of embodiments of the disclosure, any switch port not determined to be connected to another switch port (using Link Layer Discovery Protocol (LLDP) or the like), is assumed to be an access port. For the purpose of embodiments of the disclosure, endpoints are assumed to be connected to all access ports, regardless of whether endpoints are actually connected or not.

Referring to FIG. 3-2, the existing routes for data traffic intended for endpoint H4, as addressed by MAC address M4, are shown in FIG. 3-2. Any data packets addressed by MAC address M4 which arrive at an access port of switch S1 will follow the route S1—S2→S5→S6→H4. Any data packets addressed by MAC address M4 which arrive at an access port of switch S3 will follow the route S3→S5→S6→H4. Any data packets addressed by MAC address M4 which arrive at an access port of switch S4 (should it have an access port) will follow the route S4→S6→H4. This set of routes as shown form a minimum cost spanning tree over the network, with the root of the tree at H4.

With reference to FIG. 3-3, while the network is in the state described above, an Address Resolution Protocol (ARP) packet from a new endpoint H3, connected to access port 3 on switch S6, is received by the controller 200. Endpoint H3 has MAC address M3. Switch S6, like switches S1, S2, S3, S4, and S5, has been configured to send all ARP packets to the controller 200. Upon receiving the ARP packet, the controller 200, according to embodiments of the disclosure, calculates and applies a new set of routes for data packets intended for endpoint H3, assessed by MAC address M3. A description of this process is provided in the following paragraphs.

An intermediate representation of the topology is generated with edge weights (edge weights being one example of weighting) representing the number of unicast data traffic routes already assigned to each link. The weighting has a value is based on whether data traffic already flows over the link. In particular, the weighting represents the number of unicast data traffic routes already assigned to that link. An intermediate representation of the topology is shown in FIG. 3-3.

As will be appreciated by the skilled person, the unicast data traffic routes associated with endpoint H4 have been allocated a weighting of 1000. This weighting is selected because each data traffic route is allocated a nominal bandwidth of 1000 Mb/s. Therefore, if two data traffic routes are assigned to a link, that link would be allocated a weighting of 2000. Of course, this weighting is only indicative and may be different. Any weighting greater than zero may be provided.

In addition, where no unicast data traffic flows over a link, a weighting of 0 is provided. Of course, this is only indicative and any other suitable weighting is envisaged.

A known minimum spanning tree generation algorithm such as Prim's algorithm is then run on the intermediate representation of FIG. 3-3 containing the weighting on each link whose value is based on whether data traffic already flows over the link. Although a minimum spanning tree generation algorithm is noted here, the disclosure is not so limited. Any least cost path algorithm is envisaged. The minimum spanning tree generation algorithm uses the endpoint H3 as the root node of the spanning tree. The output of the minimum spanning tree generation algorithm will be referred to as a Host Specific Spanning Tree (HSST) hereinafter. The HSST is rooted on the endpoint in question and therefore is optimal for that endpoint. This means that for embodiments of the disclosure, each endpoint in the network has its own, optimal HSST for unicast traffic, which will provide better overall performance than a known Spanning Tree Protocol which provides a single spanning tree for all unicast traffic. Moreover, the HSST also allows unicast traffic to be balanced over multiple paths through the network. This provides better performance than the known Spanning Tree Protocol. A possible HSST for the calculated route for the data traffic flow for H3 is shown in FIG. 3-4.

Figures 3, 4:
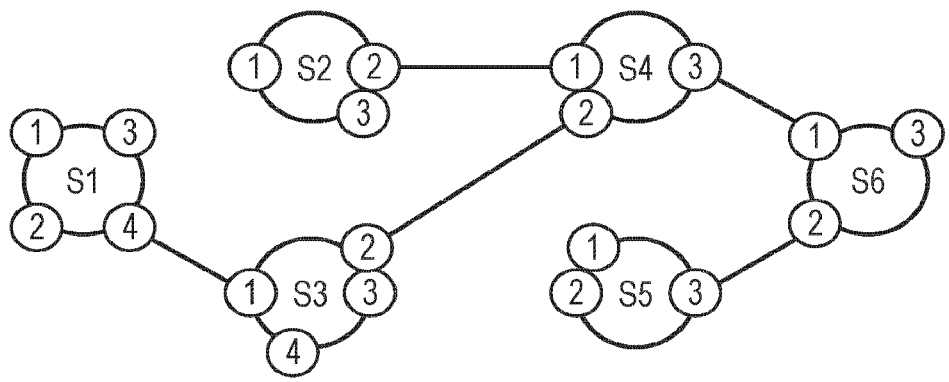

Having calculated t new HSST shown in FIG. 3-4 for the new endpoint H4 as described above, the controller 200 will apply the routes associated with the HSST to the switches S1-S6. This process will now be described.

If any existing flow routes for MAC address M3 exist in the network, these are removed. This may involve deleting existing flows from each switch in the network. As will be explained later, these cookies may be quickly identified by looking for flows in each switch identified by a predictable cookie value. In embodiments, a predictable cookie value is the 64-bit OpenFlow cookie of the form 0x2000MMMMMMMMMMMM, where x2 is a tag value associated with Unicast HSST OpenFlow Rules, and 0xMMMMMMMMMMMM is the 48-bit MAC address M3.

OpenFlow Rules for the newly generated route are then applied to each switch. For example, for switch S1, the OpenFlow Rule will be "S1: cookie: 0x2000MMMMMMMMMMMM; match:eth_dst=M3; Action: Out 4" and for switch S2, the Openflow Rule will be "S2: cookie:0x2000MMMMMMMMMMMM; match:

eth_dst-M3; Action: Out 2". The OpenFlow Rule for the remaining switches will not be described for brevity.

Figures 3, 4, 5:
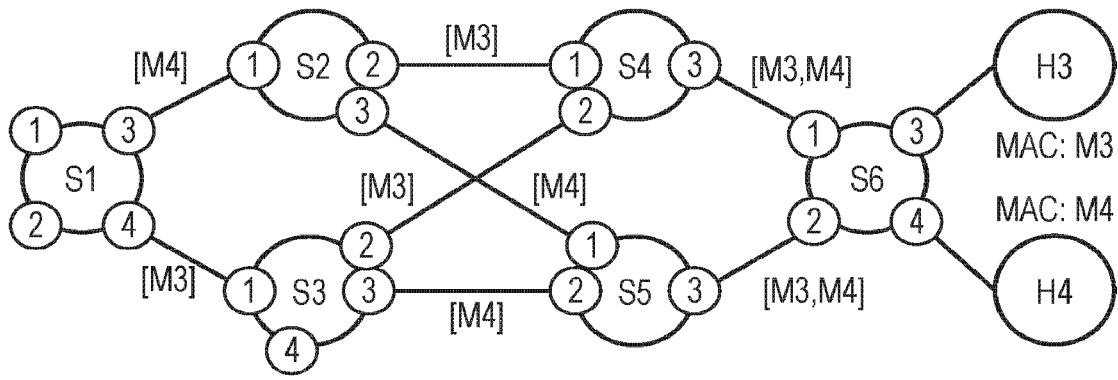
Figures 1, 4:
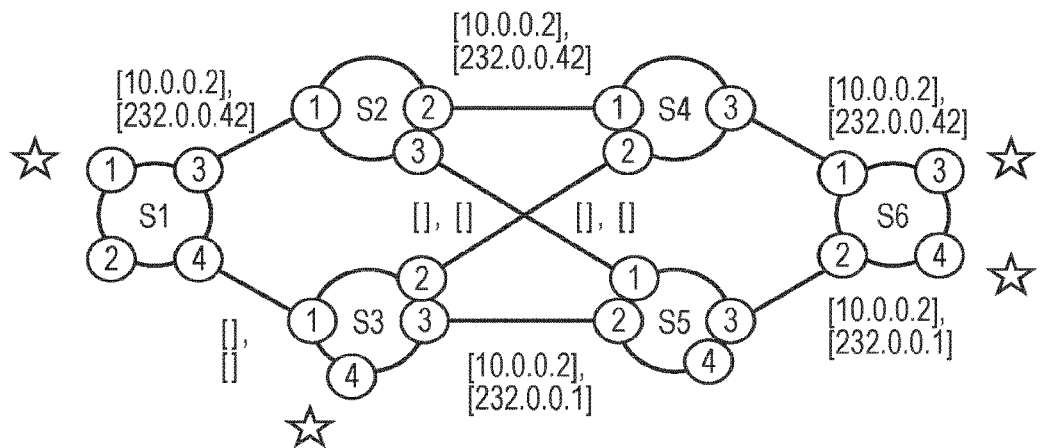
Figures 2, 4:
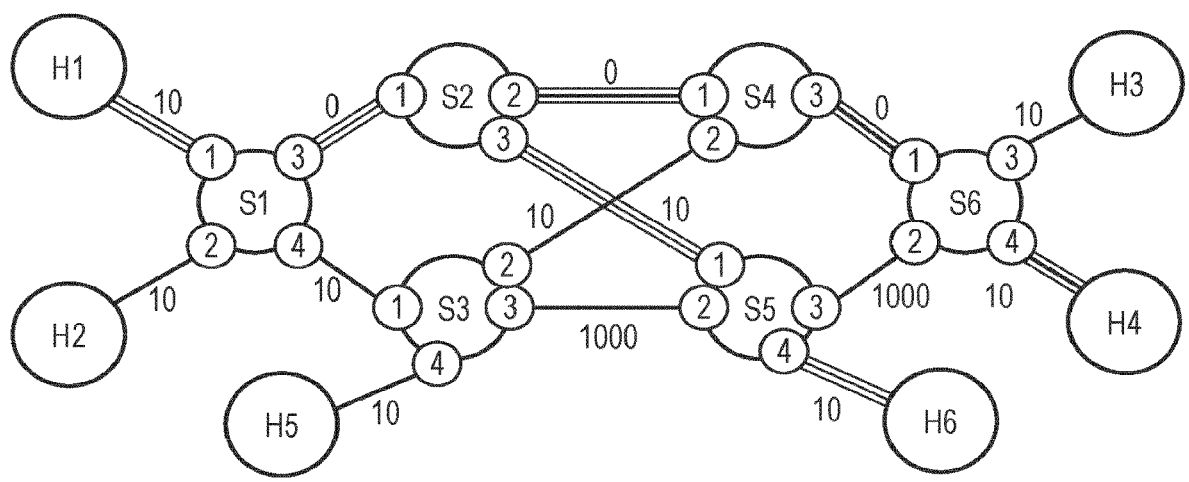
Figures 3, 4:
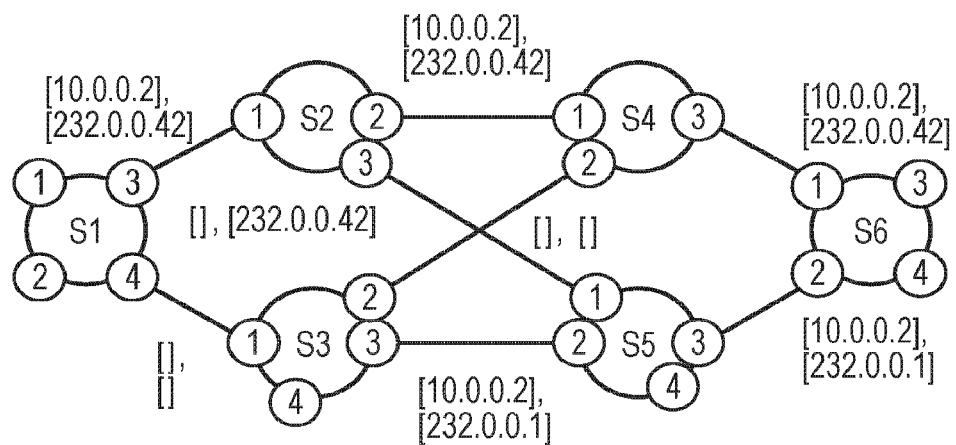
Figure 5:
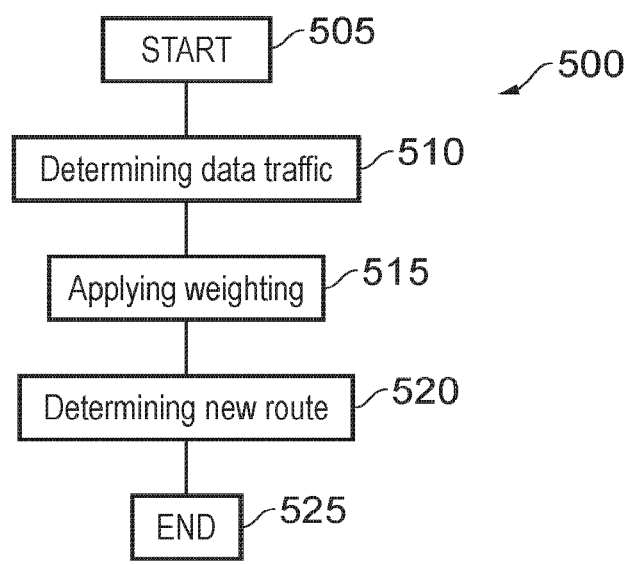

The new routes associated with the HSST shown in FIG. 3-4 will be stored back in the persistent topology model as shown in FIG. 3-5. As will be appreciated, this new persistent topology model in FIG. 3-5 is similar to FIG. 3-1 with the inclusion of the HSST associated with endpoint H3. This persistent topology model will be stored in storage 210.

The process of Unicast routing is re-iterated below.

As noted above, unicast muting is based on ARP Discovery/ARP Learning.

At start-up of the network 100, OpenFlow Rules are added to all switches S1-6 to forward ARP packets to the controller 200. When the controller 200 receives an ARP packet, a Host Specific Spanning Tree (HSST) is generated that is rooted at, and directed towards, the ingress switch and access port of that ARP packet. Any existing data traffic flow entries for the MAC address in question are first deleted (as explained above, identified by cookies, or by some other means). This means that if a unicast host is unplugged and re-attached in a different port, the routing will automatically update. Identification of relevant OpenFlow Rules is facilitated by the convention of unicast OpenFlow Rules having cookies formatted with a predetermined pattern, for example 0x2000MMMMMMMMMMMM, where x2 is a tag value identifying Unicast OpenFlow Rules and MMMMMMMMMMMM is the 48-bit MAC address of the data traffic flow being routed. The controller 200 therefore quickly iterates through all the switches in the network 100, deleting existing data traffic flows by cookie.

The HSST is generated using a minimum spanning tree generation algorithm on the intermediate topology. In examples. Prims' algorithm is used, though the disclosure is not so limited. The intermediate topology includes weightings on the links where the value of the weighting is based on how much unicast data traffic has already been assigned to that link. This achieves the technical advantage of both reducing the load on each link and providing even load balancing of unicast data traffic across alternative routes through the network 100. According to the disclosure, each endpoint attached to the network receives data via its own HSST. This achieves the technical advantage that the spanning tree for each host is optimised for that host.

The disclosure is not so limited, however. For example, an alternative method of generating a spanning tree, such as the variant of Dijkstra's algorithm which produces a shortest-path tree, could be used on an intermediate topology where the value of the weights is based on the speed of the link. This would achieve the advantage of reducing the number of hops and thus reduce the latency of the data traffic. Of course, other characteristics of the link could be used to base the value of the weighting on, such as the measured current or average traffic loads, required Quality of Service or user configurable flow priority or the like.

When the flow routing algorithm has been run and the route applied, the links in the persistent topology of the network are updated to include the newly assigned route. These weightings are then taken into account in future muting of unicast data traffic.

As would be appreciated, receipt of subsequent ARP packets for the same unicast host, if received on the same port of the same switch, will not generate a new route. Instead, a time associated with the current route will be reset. This means that if no ARP packets from a unicast host are detected within a given time period (for example, because the unicast host has become disconnected), the timer associated with that route will expire and the OpenFlow Rules for that route will be deleted from switches S1-6 in the network. In this instance, the persistent topology model of the network 100 will be updated to remove the bandwidths associated with that host and so if the host sends ARP packets later, a new route will be generated as described above.

Multicast Routing

Referring to FIG. 4-1 the network of FIG. 1 with IP addresses for multicast links is shown. In particular, in FIG. 4-1 an initial network state is shown.

In the initial network state, the senders of multicast data traffic are at Switch S3 Port 4 (henceforth denoted [S3/4]), multicasting on multicast address 232.0.0.1; and [S1/1], multicasting on multicast address 232.0.0.42. In other words, the senders of multicast data traffic are at access port 4 of switch S3 and access port 1 of switch S1. Additionally, the receivers of multicast data traffic are at [S6/3] and [S6/4]. In other words, the receivers of multicast data traffic are at access port 3 of switch S6 and access port 4 of switch S6. The routes of the multicast data traffic flow are {232.0.0.1: {(S3/4,S6/3): [S3/3, S5/3, S6/3]}, and 232.0.0.42: {(S1/1, S6/4): [S1/3, S2/2, S4/3, S6/4]}}; where {232.0.0.1: {Routes}} denotes a set of individual Source Specific Multicast (SSM) routes for multicast group address 232.0.0.1; and for that multicast group address {(S3/4,S6/3): [S3/3, S5/3, S6/3]} denotes an constituent individual SSM route from port 3 of switch S3 to port 3 of switch 6, the route comprising egress from port 3 of S3, then egress from port 3 of S5, then egress from port 3 of S6. In other words, the route for multicast data flow from 232.0.0.1 is from access port 4 of switch S3, out of trunk port 3 of switch 3, through switch S5 and out of access port 3 of switch S6; and the route for multicast data flow from 232.0.0.42 is from access port 1 on switch S1 through switch S2 and S4 and out of access port 4 of switch S6.

As noted above, this is the initial state of the network. A new route for data traffic flow is then required by, say, an Internet Group Management Protocol (IGMP) Join for 232.0.0.42 being received from an endpoint at access port 4 of switch S5. The Multicast Senders List stored within the controller 200 is searched for 232.0.0.42 sources. A source is found at access port 1 of switch S1. Therefore, a route for data traffic flow from access port 1 of switch 1 to access port 4 of switch S5 is required.

As in the embodiment described above for unicast, an intermediate representation of the network topology is generated. This is generated with weightings for multicast group 232.0.0.42. As described above in respect of the unicast embodiment, links already carrying 232.0.0.42 are weighted with 0. This allows for the link to be used for free as the link is already carrying data traffic for 232.0.0.42. Of course, any small weighting is envisaged. Empty links (that is, links carrying no traffic) have a weighting of 10 (or some other weighting higher than the weighting for a link carrying data traffic for 232.0.0.42) and other links having multicast traffic (not 232.0.0.42) have a weighting of 1000×N wherein N is the number of multicast groups already assigned (or some other weighting higher than the empty link weighting. Access links are assigned an arbitrary weighting; in this case a weighting of 10 has been used. This intermediate representation of the topology is shown in FIG. 4-2.

A known least-cost flow routing algorithm such as Dijkstra's algorithm is then run on the intermediate representation of FIG. 4-2 containing the weighting on each link whose value is based on whether data traffic already flows over the link. A new route is determined. This route is [S1/3, S2/3, S5/4]. In other words, the route is from access port 1 of switch S1, via trunk port 3 of switch S1, via trunk port 3 of switch S2 and finally via access port 4 of switch S5.

The use of this mechanism has also ensured that the new data traffic flow route re-uses access port 3 of switch S1 and avoids the link from access port 2 of switch S6 that already carries 232.0.0.1. This balances the load on the network.

This new route is added to the routes table within storage 210 and the persistent topology model of the multicast network is updated by adding 232.0.0.42 to the link of access point 3 of switch S2. The routes part of the network state therefore is Routes: {232.0.0.1: {(S3/4,S6/3): [S3/3, S5/3, S6/3]}, 232.0.0.42: {(S1/1,S6/4): [S1/3. S2/2, S4/3, S6/4], (S1/1,S5/4): [S1/3, S2/3, S5/4]}}.

Note here that a new record for S1/1→S5/5 has been added to the existing record for S1/1→S6/4 in the table for multicast address 232.0.0.42. The individual routes are tracked separately in order to allow them to be removed separately in response to a relevant IGMP Leave message.

Accordingly, the new persistent topology model is:
Senders: {232.0.0.1: [S3/4], 232.0.0.42: [S1/1]}
Receivers: {232.0.0.1: [S6/3], 232.0.0.42: [S6/4,S5/4]}
Routes: {232.0.0.1: {(S3/4,S6/3): [S3/3, S5/3, S6/3]},
232.0.0.42: {(S1/1,S6/4): [S1/3, S2/2, S4/3, S6/4],
(S1/1,S5/4): [S1/3, S2/3, S5/4]}}

The new persistent topology model is shown in FIG. 4-3.

The individual routes for the multicast group 232.0.0.42 are then combined into a single route graph and data traffic flow and group entries are applied to the affected switches. This may require existing entries to be removed or updated.

The individual routes for 232.0.0.42 are {(S/1,S6/4): [S1/3, S2/2, S4/3], S6/4], (S1/1,S5/4): [S1/3, S2/3, S5/4]}

The single route for 232.0.0.42: {S1: [3], S2: [2, 3], S4: [3], S5: [4], S6: [4]}.

In this notation 232.0.0.42: {S1: [3], S2: [2, 3], . . . } denotes that multicast traffic addressed with the multicast address 232.0.0.42 arriving at switch S1 should egress from port 3 of switch S1, multicast traffic addressed with the multicast address 232.0.0.42 arriving at switch S2 should egress from ports 2 and 3 of switch S2, and so forth for all relevant switches in the network. The single route is calculated for each switch by collecting the output ports used by all the individual routes for that switch into a set; thus for switch S2 the individual routes are (S1/1,S6/4): [. . . , S2/2, . . . ] and (S1/1,S5/4): [. . . , S2/3, . . . ], and the combined set of ports are {. . . S2: [2, 3] . . . }.

The switches in the network are provided with the following OpenFlow Rules.
OpenFlow Rules for S1: match ipv4_dst=232.0.0.42→Group N₁; where Group N₁; [Out: 3]
OpenFlow Rules for S2: match ipv4_dst=232.0.0.42→Group N₂; where Group N₂; [Out: 2. Out: 3]
OpenFlow Rules for S4: match ipv4_dst=232.0.0.42→Group N₃; where Group N₃; [Out: 3]
OpenFlow Rules for S5: match ipv4_dst=232.0.0.42→Group N₄; where Group N₄; [Out: 4]
OpenFlow Rules for S6: match ipv4_dst=232.0.0.42→Group N₅; where Group N₅; [Out: 4]

As noted above, when a multicast receiver wishes to join the network 100, the controller 200 receives an IGMP Join packet. Similarly, when the receiver is to leave the network 100, the controller 200 will receive an IGMP Leave packet or via a timeout.

While the locations of multicast receivers can be determined from the ingress switch and port of IGMP packets, the locations of multicast senders must be determined by sampling the data traffic at the access ports of the network 100.

Such sampling is used to construct the Multicast Senders List referenced above. The process of sampling the data traffic and constructing the list will now be described.

At start up, a flow entry is written to each switch S1-6 in the network 100 to send all the multicast packets arriving at access ports to the controller 200. This is done using a "send to controller" OpenFlow Rule, henceforth denoted as Sampling Rule A. When a multicast packet is received at a switch, therefore, the switch forwards this to the controller 200 according to Sampling Rule A. The controller 200 notes the ingress switch and the access port, as well as the multicast address, and inserts a record into the Multicast Senders List associating the multicast address with the ingress switch and access port. The controller 200 then writes an OpenFlow Rule, henceforth referred to as Sampling Rule B, back to the switch to drop any packets arriving at the ingress access port addressed to that multicast group. Sampling Rule B has a higher priority than Sampling Rule A; in this way, only the first multicast packet addressed to the multicast address to be sent to the controller. In this way, the controller 200 is not overwhelmed with all multicast packets. Finally, the original multicast packet sampled by Sampling Rule A is caused to be flooded from the ingress switch by the controller 200, so the multicast packet is not lost.

If and when an IGMP Join for that multicast group is received, the OpenFlow Rules comprising the combined route for that multicast group, as described above, are applied with an even higher priority than Sampling Rule B. In this way, the combined route will override the DROP action of Sampling Rule B.

It will be understood that Sampling Rule A and Sampling Rule B apply to a given access port on a given switch, and each access port of each switch will have an associated and independent pair of OpenFlow Rules Access Rule A and access Rule B relating to that access port only.

A time out rule times out after a configurable time. The controller 200 will update its record of the multicast source or multicast receiver after the configurable time. A multicast receiver timing out will cause the controller 200 to remove the associated routes from the switches S1-6. It is the responsibility of each receiver endpoint to send sufficient IGMP packets to keep the route active.

However, a multicast source timing out will only cause the source record to be removed from the controller 200, and Sampling Rule B for that ingress port to be removed: the routes will remain in the switches S1-6. This ensures that any multicast flows that are in use will not be disturbed. In the absence of higher-priority multicast routing OpenFlow Rules, because Sampling Rule B has timed out and been removed, any subsequent multicast packets addressed by that multicast address arriving on the ingress port will be sent to the controller by Sampling Rule A. This will cause the re-establishment of Sampling Rule B, and the record to be restored in the Multicast Sources List.

Broadcast Routing

It is possible to handle broadcast routing by generating a static spanning tree when the network 100 is initialised or when a topology change is detected. This is applied to the switches S1-6 using static OpenFlow Rules within each switch S1-6.

Broadcast routing is initialised at start up by applying a set of static OpenFlow Rules representing a static Global Spanning Tree (GST). The GST is refreshed whenever a topology change is detected. When the GST is applied, all pre-existing broadcast flow and group entries are deleted. This is achieved by deleting OpenFlow Rules with cookies matching a known pattern associated with the broadcast GST, or by some other means, before the new GST is applied.

In embodiments, on a topology change, only necessary broadcast OpenFlow Rules are re-calculated which is more efficient.

As with the unicast and multicast embodiments, the GST is generated from an intermediate topology representation of the network 100. Unlike the HSSTs used for unicast traffic, in broadcast embodiments a single Global Spanning Tree must be used, which cannot be optimal for all endpoints. Therefore, in the broadcast embodiment, a heuristic algorithm is used to generate a GST which is likely to be as efficient as possible, on average, for all endpoints.

In the intermediate topology representation for the broadcast embodiment, a directed graph is used, and the value of the weighting for a link represents the connectedness of the destination node of that link. In other words, the value of the weighting for the directed link is based on the number of switches the destination node is connected to. Additionally, the most connected node (or a choice of one of the equally most connected nodes if there are more than one) is chosen as the root node of the GST. Together, these heuristics concentrate the GST on the most connected parts of the network which are likely to be the hub nodes of a real world network. Based on these heuristics, a Minimum Spanning Tree (MST) is generated across the network. This MST is the GST.

For each switch S1-6, for port of that switch on the GST, an OpenFlow Rule and OpenFlow Group Entry is applied to send broadcast traffic arriving on that GST port to the OpenFlow Group, and for the group to Packet-Out from each of the other ports on the GST.

For example, if a switch X has ports A, B, C, and D, of which ports A, B, and D are on the GST, and port C is not on the GST, the following OpenFlow Rules would be applied:

Rule 1 for SX: match eth_dst=ff:ff:ff:ff:ff:ff, in_port=A→Group $N_A$; where Group $N_A$: [Out: B, D]
Rule 2 for SX: match eth dst=ff:ff:ff:ff:ff:ff, in_port=B→Group $N_B$; where Group $N_B$: [Out: A, D]
Rule 3 for SX: match eth_dst=ff:ff:ff:ff:ff:ff, in_port=D→Group $N_D$; where Group $N_D$: [Out: A, B]

This mechanism is efficient in terms of routing speed and resource usage on the controller 200 as the controller 200 does not see any broadcast packets.

Removing Data Traffic Flows in Switches Using Cookies

As noted above, it is possible to remove OpenFlow Rules from switches efficiently using cookies. The use of cookies allows the removal of the Rules without keeping a record of the exact rules, which would otherwise be required by the OpenFlow Application Programming Interface.

This is achieved by associating every OpenFlow Rule with a cookie that has a predictable format based on its purpose.

In particular, each cookie contains a tag value part, which identifies the traffic type and purpose of the associated OpenFlow Rule. In embodiments, the tag value is the most significant 4-bits of the 64-bit OpenFlow value. In embodiments the remainder of the cookie contains additional information such as IP addresses, MAC addresses or port numbers. However it will be appreciated that other predictable encodings are possible.

In the case of IPv4 Source Specific Multicast (SSM) cookies, packing the 32-bit multicast address and 32-bit unicast address into a 64-bit OpenFlow cookie requires the full 64-bits. In this case, it is noted that all IPv4 multicast addresses start with the 4-bit value 0xE. Therefore in embodiments, the multicast address is packed into the top four bytes of the cookie, and the value 0xE is used to identify the cookie as relating to an SSM route. It will be appreciated that any other 4-bit tag value could also be used without limiting the ability to re-construct the multicast address from the cookie, or the cookie from the multicast address.

OpenFlow allows rule entries to be selected, manipulated or deleted by cookie and mask. Using cookies in this manner also helps to identify OpenFlow Rules for debugging and analysis purposes.

Exemplary formats for cookies are provided in FIG. 6.

FIG. 5 shows a flow chart 500 describing the steps carried out by the processing circuitry 205 of the controller 200. The flowchart 500 starts at step 505 and moves to step 510. In step 510 the processing circuitry 205 determines whether data traffic already flows between the first and second network switch 40 over the link. The process moves to step 515 where the processing circuitry 205 applies a weighting to the link whose value is based on either whether data traffic already flows over the link or the speed of data traffic over the link depending upon embodiments. The process then moves to step 520 where the processing circuitry 205 determines the new route for data traffic by using a flow routing algorithm using the weighting. The process moves to step 525 where the process ends.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A method of calculating a new route for a media data traffic flow on a computer network when a device is connected to the network, the network comprising a first and a second network switch connected by a link, the method comprising:

determining whether media data traffic already flows between the first and second network switch over the link;

applying a weighting to the link whose value is based on whether media data traffic already flows over the link; and determining the new route for media data traffic by using a least cost path generation algorithm using the weighting.

2. A method according to clause 1, wherein the value of the weighting is determined in accordance with either the amount of media data traffic assigned to the link or the amount of media data traffic flowing over the link.

3. A method according to clause 2, wherein when the media data traffic is unicast media data traffic, the weighting is 0 if media data traffic does not flow over the link.

4. A method according to clause 1, wherein when the media data traffic is multicast media data traffic, the value of the weighting is lower when media data traffic does already flow to the same IP multicast address as the device being connected to the network over the link, than when no media data traffic is flowing over the link.

5. A method according to clause 4, wherein the value of the weighting is 0 if media data traffic does already flow to the same IP multicast address as the device being connected to the network over the link.

6. A method according to any preceding clause, comprising: updating the first and second switch with the new route using a cookie, wherein the cookie includes a tag value part relating to the purpose of an associated OpenFlow Rule.

7. A method according to clause 6, wherein the tag value part is the top 4 bits of the cookie.

8. A method of calculating a new route for data traffic flow on a computer network comprising a first and a second network switch connected by a link, the method comprising:

determining whether data traffic already flows between the first and second network switch over the link;

applying a weighting to the link whose value is based on the speed of data traffic over the link; and determining the new route for data traffic by using a least cost path generation algorithm using the weighting.

9. A method according to any preceding clause wherein the least cost path generation algorithm is a minimum tree spanning generation algorithm.

10. A computer program comprising computer readable instructions which, when loaded onto a computer, configures the computer to perform a method according to any one of clauses 1 to 9.

11. A computer program product configured to store the computer program of clause 10 therein or thereon.

12. A controller for calculating a new route for a media data traffic flow on a computer network when a device is connected to the network, the network comprising a first and a second network switch connected by a link, the apparatus comprising processing circuitry configured to:

determine whether media data traffic already flows between the first and second network switch over the link;

apply a weighting to the link whose value is based on whether media data traffic already flows over the link; and determine the new route for media data traffic by using a least cost path generation algorithm using the weighting.

13. A controller according to clause 12, wherein processing circuitry is configured to determine the value of the weighting in accordance with either the amount of media data traffic assigned to the link or the amount of media data traffic flowing over the link.

14. A controller according to clause 13, wherein the processing circuitry is configured so that when the media data traffic is unicast media data traffic, the weighting is 0 if media data traffic does not flow over the link.

15. A controller according to clause 12, wherein the processing circuitry is configured so that when the media data traffic is multicast media data traffic, the value of the weighting is lower when media data traffic does already flow to the same IP multicast address as the device being connected to the network over the link, than when no media data traffic is flowing over the link.

16. A controller according to clause 15, wherein the value of the weighting is 0 if media data traffic does already flow to the same IP multicast address as the device being connected to the network over the link.

17. A controller according to any one of clause 12 to 16, wherein the processing circuitry is configured to: update the first and second switch with the new route using a cookie, wherein the cookie includes a tag value part relating to the purpose of an associated OpenFlow Rule.

18. A controller according to clause 17, wherein the tag value part is the top 4 bits of the cookie.

19. A controller for calculating a new route for data traffic flow on a computer network comprising a first and a second network switch connected by a link, the controller comprising processing circuitry configured to:

determine whether data traffic already flows between the first and second network switch over the link;

apply a weighting to the link whose value is based on the speed of data traffic over the link; and determine the new route for data traffic by using a least cost path generation algorithm using the weighting.

20. A controller according to any one of clauses 12 to 19 wherein the least cost path generation algorithm is a minimum tree spanning generation algorithm.

The invention claimed is:

1. A method of calculating a new route for a media data traffic flow on a computer network in response to a device being connected to the network, the network comprising a first and a second network switch connected by a link, the method comprising:

determining an amount of media data traffic that flows between the first and second network switch over the link;

applying a weighting to the link, a value of the weighting being based on the amount of media data traffic flowing over the link; and determining the new route for the media data traffic by using a least cost path generation algorithm using the weighting, wherein the determined new route is applied to all flows belonging to a same bundle, wherein the value of the weighting is determined in accordance with the amount of the media data traffic flowing over the link, and wherein in response to determining the media data traffic is multicast media data traffic, the media data traffic that already flows to a same IP multicast address as the device has a lower weighting than a situation in which none of the media data traffic is flowing over the link, and wherein the value of the weighting is 0 for the media data traffic that already flows to the same IP multicast address as the device connected to the network over the link.

2. The method according to claim 1, wherein when the media data traffic is unicast media data traffic, the weighting is 0 if the media data traffic does not flow over the link.

3. The method according to claim 1, comprising: updating the first network switch and the second network switch with the new route using a cookie, wherein the cookie includes a tag value part relating to a purpose of an associated OpenFlow Rule.

4. The method according to claim 3, wherein the tag value part is a top 4 bits of the cookie.

5. The method according to claim 1 wherein the least cost path generation algorithm is a minimum tree spanning generation algorithm.

6. A method of calculating a new route for data traffic flow on a computer network including a first and a second network switch connected by a link, the method comprising:
determining an amount of data traffic that flows between the first and second network switch over the link;
applying a weighting to the link, a value of the weighting being based on a speed of data traffic over the link; and
determining the new route for the data traffic by using a least cost path generation algorithm using the weighting,
wherein the determined new route is applied to all flows belonging to a same bundle,
wherein the value of the weighting is determined in accordance with the amount of the data traffic flowing over the link, and
wherein in response to determining the data traffic is multicast media data traffic, the media data traffic that already flows to a same IP multicast address has a lower weighting than a situation in which none of the media data traffic is flowing over the link, and wherein the value of the weighting is 0 for the media data traffic that already flows to the same IP multicast address connected to the network over the link.

7. A non-transitory computer readable medium having stored thereon a computer program comprising computer readable instructions which, when loaded onto a computer, configures the computer to perform a method according to claim 1.

8. An apparatus for calculating a new route for a media data traffic flow on a computer network in response to a device is connected to the network, the network including a first and a second network switch connected by a link, the apparatus comprising:
processing circuitry configured to:
determine an amount of media data traffic that flows between the first and second network switch over the link;
apply a weighting to the link, a value of the weighting being based on the amount of media data traffic that flows over the link; and
determine the new route for the media data traffic by using a least cost path generation algorithm using the weighting,
wherein the determined new route is applied to all flows belonging to a same bundle,
wherein the value of the weighting is determined in accordance with the amount of the media data traffic flowing over the link, and
wherein in response to determining the media data traffic is multicast media data traffic, the media data traffic that already flows to a same IP multicast address as the device has a lower weighting than a situation in which none of the media data traffic is flowing over the link, and wherein the value of the weighting is 0 for the media data traffic that already flows to the same IP multicast address as the device connected to the network over the link.

9. The apparatus according to claim 8, wherein the processing circuitry is configured to: update the first network switch and the second network switch with the new route using a cookie, wherein the cookie includes a tag value part relating to a purpose of an associated OpenFlow Rule.

10. The apparatus according to claim 9, wherein the tag value part is a top 4 bits of the cookie.

11. An apparatus for calculating a new route for data traffic flow on a computer network comprising a first and a second network switch connected by a link, the apparatus comprising:
processing circuitry configured to:
determine an amount of data traffic that flows between the first and second network switch over the link;
apply a weighting to the link, a value of the weighting being based on a speed of data traffic over the link; and
determine the new route for the data traffic by using a least cost path generation algorithm using the weighting,
wherein the determined new route is applied to all flows belonging to a same bundle,
wherein the value of the weighting is determined in accordance with the amount of the data traffic flowing over the link, and
wherein in response to determining the data traffic is multicast media data traffic, the media data traffic that already flows to a same IP multicast address has a lower weighting than a situation in which none of the media data traffic is flowing over the link, and wherein the value of the weighting is 0 for the media data traffic that already flows to the same IP multicast address connected to the network over the link.

12. The apparatus according to claim 8, wherein the least cost path generation algorithm is a minimum tree spanning generation algorithm.

* * * * *